(No Model.)
W. H. HORN.
WHEAT AND CORN CULTIVATOR.
No. 385,670. Patented July 3, 1888.
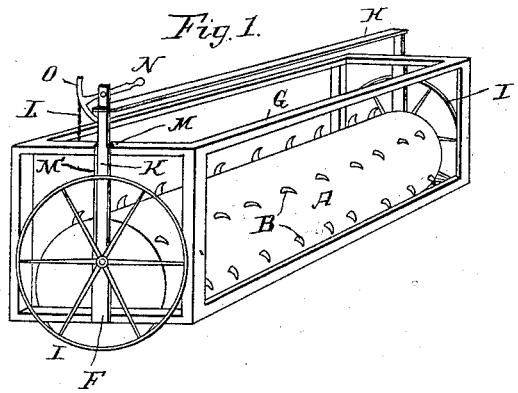
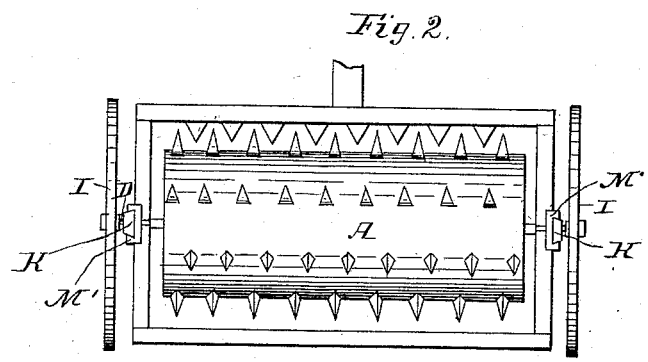
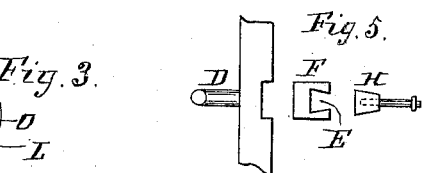
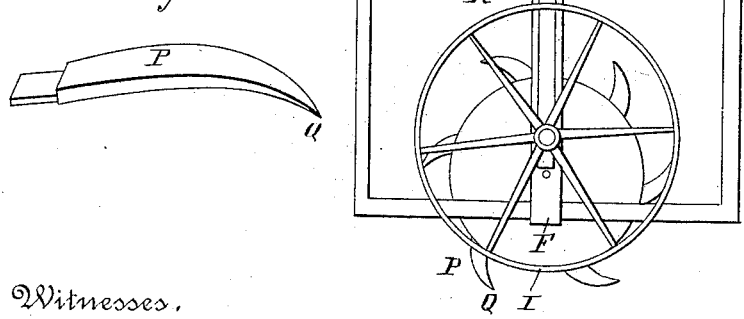
Witnesses,
C. T. Belt
C. J. Stockman.
Inventor,
William H. Horn.
By his Attorney
C. D. Campbell.
N. PETERS, Photo-Lithographer, Washington, D. C.

UNITED STATES PATENT OFFICE.

WILLIAM H. HORN, OF NEAR BELLEFONTAINE, OHIO.

WHEAT AND CORN CULTIVATOR.

SPECIFICATION forming part of Letters Patent No. 385,670, dated July 3, 1888.

Application filed July 17, 1885. Serial No. 172,571. (No model.)

*To all whom it may concern:*

Be it known that I, WILLIAM H. HORN, a citizen of the United States, and a resident of near Bellefontaine, in the county of Logan and State of Ohio, have invented a new and useful Wheat and Corn Worker, of which the following is a specification.

My invention is an improvement in toothed rollers for working young wheat and corn; and it consists, essentially, in shaping my teeth so that they will enter the ground with a rolling motion and raise the ground as they leave it, loosening and raising the ground very much as it is left on the withdrawal of the teeth of a garden-rake when inserted in the ground at an angle of, say, forty-five degrees and then raised vertically.

It also consists in mounting my roller adjustably in a frame which is mounted on wheels, so that the roller may be raised out of contact with the ground when going to or from the field, and in providing a set of cleaning-teeth on the rear of the frame to keep the roller clean of weeds, but especially consists in the shape of my teeth, which are wedge-shaped on their face, and curved, as shown, and in causing them to enter the ground backward, or at the swell of the curve, and leave it point last.

Figure 1 is a perspective view of my invention; Fig. 2, a top view; Fig. 3, an end view; Fig. 4, a perspective of one of my wedge-shaped curved teeth; Fig. 5, a top view of roller-axle, wheel-axle, slide, and standard disconnected.

A is my roller; B, curved teeth; C, clearing-teeth; D, axle of roller; E, slot in which axle of wheels plays; F, lower part of frame in which the roller is mounted; G, upper part of frame; H, connecting pieces or standards; I, wheels on which frame is mounted; K, standards in which wheels I are pivoted; L, chain which lies in a groove in semicircular cam O, mounted on standard K; N, handle for operating cam O; M, cross-piece of frame, in a slot in which standard K plays.

The construction and operation of my device are as follows:

A rectangular frame is mounted on the wheels I, which have their bearings in standards K, which slide in slots E in standards F. The roller is pivoted in frame K, and is raised or lowered by means of the cam O and handle N. As the roller advances, the back of each tooth cuts into the ground at point P with a rolling motion, and as the teeth lift the earth up very much in the manner that it is raised by a garden-rake, stirring and loosening the earth in a manner very different from the straight tooth, and from all those entering point first, leaving the soil in a loose condition, while the roller smooths the surface, I find this style of roller admirably adapted for preparing land for planting, but more especially for rolling and loosening the surface after planting, and especially for loosening the ground around young growing wheat and corn.

The shape of my tooth and its action in entering and leaving the ground render my device a most effectual one for this purpose, stirring, lifting, and loosening the soil in a very gratifying manner, while the peculiar rolling motion of the teeth prevents them injuring the young corn or wheat should the teeth strike them.

At one end of my frame is a standard, M', in which upright piece K slides. A lever, N, is pivoted on piece K and carries the grooved cam O. Attached to the upper end of this cam is a chain, which is attached at its other end to frame H. In going to and from the field the lever N is brought into position shown in dotted lines in Fig. 3, lifting the roller and teeth free of the ground, the axle D sliding up the slot E in standard M.

In my drawings I have shown my teeth arranged in rows diagonally across the face of the roller; but in practice I generally prefer to place the teeth in rows straight around the roller at such distances apart that the curve of one tooth strikes the ground where the point of the last tooth left it, making a continuous cut or path across the field.

I disclaim the use of my teeth in a frame or any manner that will give a dragging or straight cutting motion, but only in a rolling backward motion separated from all dragging motion.

What I claim is—

1. An implement for working young growing wheat and corn, composed of a frame, a tongue, and a roller, A, which has the curved double wedged-shape teeth B, that enter the ground backward, as described, so as not to injure the young plants while loosening the ground, as and for the purpose set forth.

2. The combination, with the roller A, having the double wedge-shaped curved teeth B, which enter the ground backward, of wheels I and hoisting apparatus K M N O, as and for the purpose set forth.

WILLIAM H. HORN.

Witnesses:
J. W. HALFHILL,
U. S. G. CHERRY.